Nov. 27, 1962  J. P. RASOR  3,066,256
DETECTOR FOR FLAWS IN BURIED PIPE AND THE LIKE
Filed Oct. 6, 1958  3 Sheets-Sheet 1

INVENTOR.
JOHN P. RASOR
BY
ATTORNEY

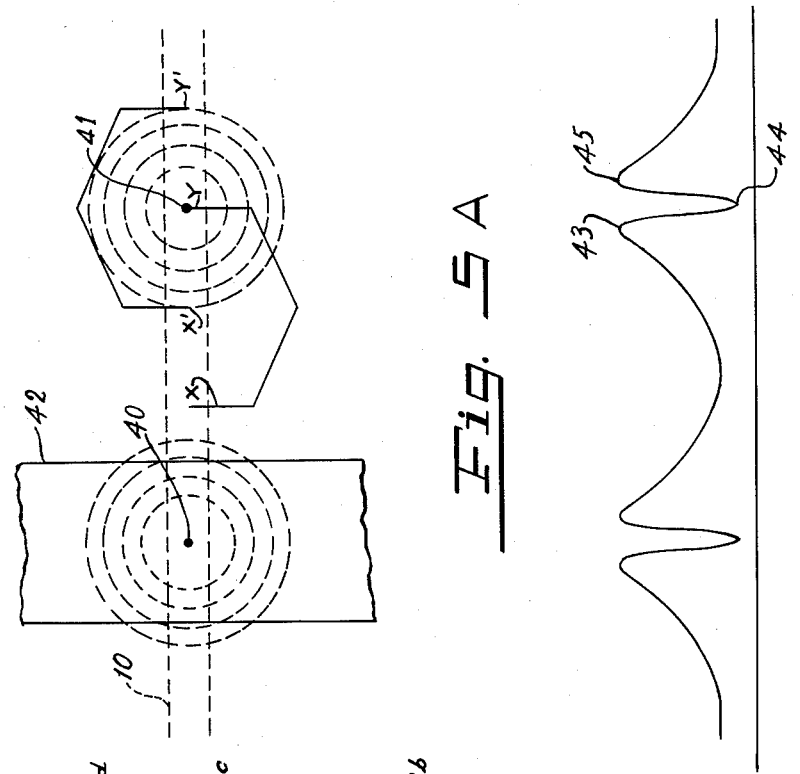
Fig. 5A
Fig. 5B
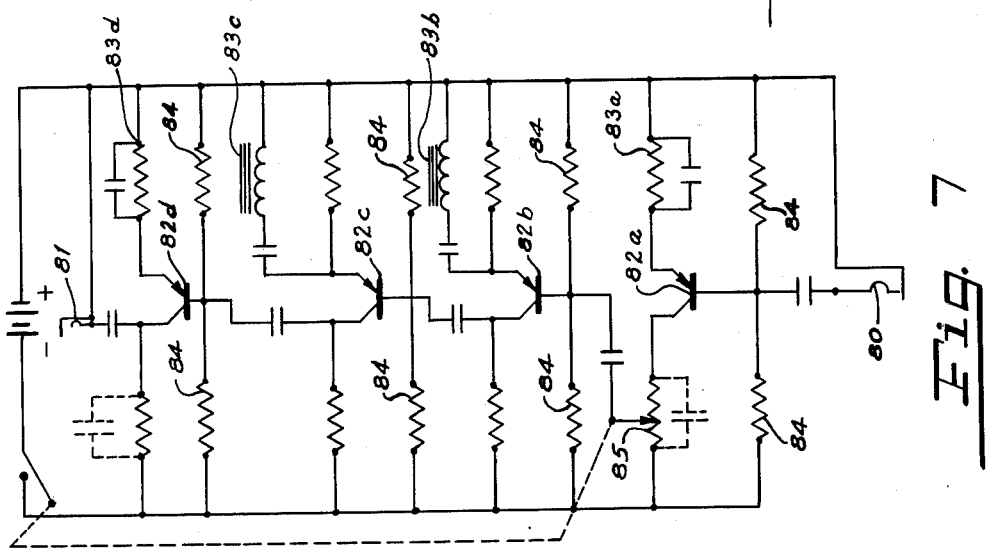
Fig. 7
INVENTOR.
JOHN P. RASOR
BY Edward B. Gregg
ATTORNEY

INVENTOR.
JOHN P. RASOR
BY
ATTORNEY

United States Patent Office 3,066,256
Patented Nov. 27, 1962

3,066,256
DETECTOR FOR FLAWS IN BURIED PIPE
AND THE LIKE
John P. Rasor, P.O. Box 281, San Gabriel, Calif.
Filed Oct. 6, 1958, Ser. No. 765,432
7 Claims. (Cl. 324—54)

This invention relates to a method and to an apparatus for detecting flaws in nonconductive, protective coatings on remote conductors. More particularly this invention relates to the detection of flaws in the protective coatings on buried steel pipe.

Steel pipe employed to convey liquid petroleum products, natural gas, water and other fluids is commonly coated with a protective layer to prevent corrosion. In the case of natural gas pipelines (which will serve to illustrate the present invention), lengths of steel pipe are joined by welding, the welded pipe is coated with enamel and it is then wrapped with a heavy paper. The welded, coated pipe is then placed in trenches and covered with soil.

Coated pipe of this character can be inspected electrically before it is placed in a trench and covered, such inspection being by means of apparatus known as a "holiday detector." A holiday detector comprises an exploring electrode adapted to contact the outer surface of the coated pipe, a means for generating a high voltage (which may be a D.C., an A.C. or a pulsating voltage) and a signal system. The pipe is grounded and the output of the high voltage generator is connected to the exploring electrode. As the exploring electrode is caused to pass along the pipe, the pipe coating interposes a barrier of high resistance such that little or no current flows and the signal is not actuated. However, when a flaw (or a "holiday" as it is known in the art) is contacted a surge of current flows through the flaw to the grounded pipe and actuates the signal. This signal may be a ringing bell and/or a flashing light, or it may be some other visible or audible means of indicating the existence and location of a flaw. In fact, the arcing which occurs through a flaw from the exploring electrode to the grounded pipe will frequently be sufficient to indicate the existence and location of a flaw.

A very effective holiday detector for such purposes is that described in Tinker U.S. Patent No. 2,629,002 and a suitable circuit therefore is described in Rasor U.S. Patent No. 2,650,346.

Holiday detectors of this character are limited to the inspection of pipe coatings before the pipe is buried in the ground. That is to say, they are not suited to locate flaws in the coating of a pipe which has been buried or is otherwise physically inaccessible. For the purpose of locating flaws in buried pipe a type of detector has been available for many years which is known as the Pearson holiday detector or locator. In the Pearson detector an alternating voltage having an audio frequency is imposed on a buried pipe, as by connecting one terminal of a hummer or other suitable audio frequency generator to the metal of the pipe, the other terminal being grounded. An alternating voltage of audio frequency is, therefore, applied to the pipe and it is picked up by an audio receiver and amplified to give a characteristic signal which can be heard in earphones or otherwise audibly or visually observed. The way in which the signal is picked up in accordance with the Pearson detector is as follows:

Two operators are employed each of whom wears metal cleats on his feet. The two operators walk along a pipeline right of way a suitable distance apart, for example, ten, twenty or thirty feet apart. One of the operators carries a receiver-amplifier unit, the input of which is connected to the cleats of both operators. As the two men walk along the pipeline right of way, if the soil resistance over the pipe is uniform, a steady characteristic hum is heard which increases greatly in volume when either of the operators steps on ground immediately overlying a flaw. This signal will be repeated when the other operator steps on the same spot, thereby providing a check.

In practice, however, considerable difficulty has been encountered because of varying soil conditions. Thus the composition of soil and its moisture content have a great effect upon its conductivity, hence upon the operation of the Pearson detector. Also, if the surface of the soil is hard it will not form as good an electrical contact with the cleats as soft soil. Moreover, the presence of weeds has a considerable effect because of their conductive nature and their root systems. Moreover, where a pipe is buried beneath a pavement the Pearson detector is inoperative.

It is an object of the present invention to provide improvements upon flaw detectors for buried coated pipe and the like.

It is a further object of the invention to provide improvements upon presently available apparatus and methods for locating flaws in the coatings of buried pipe and the like, which reduce difficulties arising from varying soil and surface conditions.

Yet another object of the invention is to provide apparatus and method which can be used to locate flaws in pipe coatings beneath pavements.

A further object of the invention is to provide apparatus and method which can be used to locate flaws in the coatings of buried pipe, such apparatus and method being independent of ground contact and affected very little or not at all by varying soil conditions and surface conditions.

The above and other objects will be apparent from the ensuing description and the appended claims.

In accordance with the present invention a fluctuating signal voltage of suitable frequency, preferably an audio frequency, is applied to a pipe as in the Pearson apparatus and method, although preferably at a higher peak power level, e.g., about 15 watts instead of a few hundred milliwatts. This signal is sensed, not by electrical contacts in physical and electrical contact with the ground (such as the cleats of the Pearson method and apparatus), but by capacitor elements which are purposely held above the ground. Preferably two such capacitor elements are provided which are spaced apart a suitable distance, and they are connected to the input terminal of a suitable receiver-amplifier unit. The output terminal of the receiver-amplifier unit is connected to earphones or other suitable means of detecting the characteristic signal.

I have discovered that, by this means, two operators each carrying a metal plate or other capacitor element above the ground and interconnected in the manner described, can readily detect signals indicating the existence and location of coating flaws in buried coated pipe. I have further discovered that this apparatus and method can be used effectively to locate flaws in pipe coatings underneath paved areas where previously available apparatus and method have been inoperative. Moreover the apparatus and method are independent of ground and soil conditions.

Certain forms in which I may embody my invention are illustrated in the accompanying drawings, in which:

FIGURE 5A is a top plan view of a buried pipe, part of which is located beneath a pavement.

FIGURE 5B is a graph matched to FIGURE 5A and showing the signal picked up by the receiver of the present invention from the pipe shown in FIGURE 5A.

FIGURE 7 is a diagrammatic circuit drawing of the preferred receiver-amplifier unit.

Figure 1:
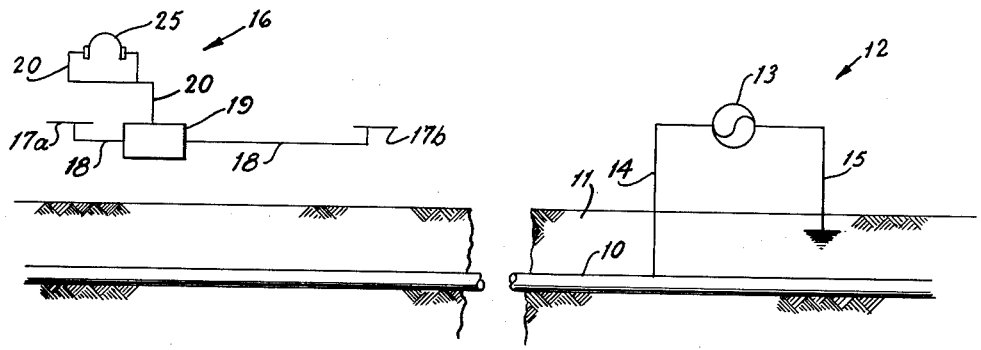
FIGURE 1 is a diagrammatic view of an underground coated pipe shown in relation to an audio signal power source such as an audio oscillator, and in relation to a receiving assembly including a pair of capacitor elements, a receiver-amplifier unit and a set of earphones.

Referring now to FIGURE 1 of the drawings, a steel pipe 10 is shown which is coated with a protective insulating coating and is buried in soil 11. A fluctuating voltage of audio frequency, for example in the range of 750 to 800 c.p.s., is applied to the metal pipe by an oscillator unit 12 comprising an audio oscillator 13, a lead 14 connected to the metal of the pipe and a lead 15 connected to ground.

The receiver system is shown at 16 and it comprises metal capacitor members such as metal plates 17a and 17b which are spaced apart and are connected by wires 18 to the input of a receiver-amplifier 19. The output of the receiver-amplifier is connected by wires 20 to earphones 25.

Figure 2:
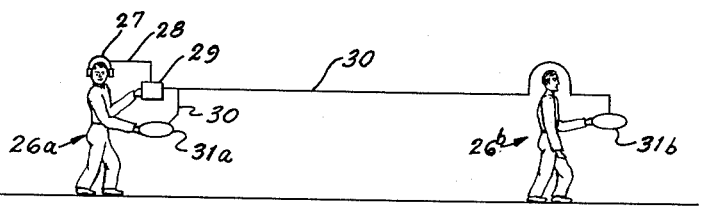
FIGURE 2 shows diagrammatically one means of conducting the inspecting operation, such means being in the form of two operators holding metal capacitor plates above ground level and at a suitable distance apart, such plates being connected to a receiver-amplifier unit carried by one of the operators.

Referring now to FIGURE 2 a particular embodiment of the receiver system and the method of carrying out the operation is there shown. Two operators are shown at 26a and 26b. One of the operators (26a) wears earphones 27 connected by a wire 28 to an audio receiver-amplifier unit 29 which is connected by wires 30 to metal capacitor plates 31a and 31b carried by the operators 26a and 26b, respectively.

Figure 3:
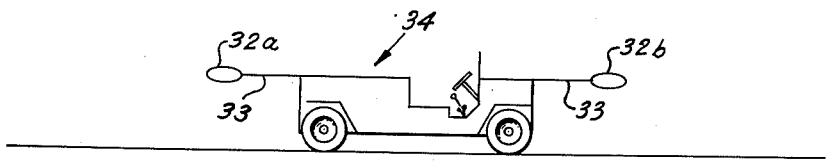
FIGURE 3 shows a motor vehicle equipped with outboard capacitor plates for carrying out the method of the invention.

Referring now to FIGURE 3, two capacitor plates 32a and 32b are shown which are carried by outboard or cantilever members 33 at the front and rear of a motor vehicle 34. A receiver-amplifier unit and signal receiving means such as earphones will be carried in the vehicle and the earphones will be worn by the driver of the vehicle or by a passenger.

Figure 4:
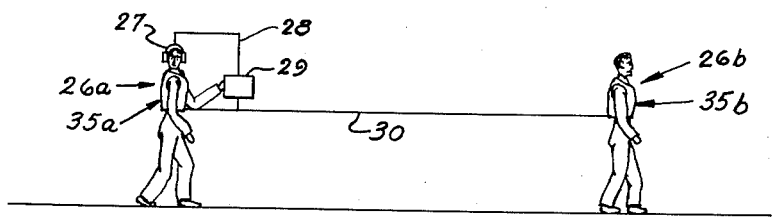
FIGURE 4 illustrates the use of metallized jackets as capacitors.

Referring now to FIGURE 4 two operators 26a and 26b are shown as in FIGURE 2, equipped with a receiver-amplifier unit 29, earphones 27 and connecting wires 30. However, instead of carrying capacitor plates as in FIGURE 2, the operators wear metallized jackets or other suitable metallized garments shown at 35a and 35b. This embodiment of the invention is convenient because it leaves both hands of each operator free.

The fluctuating voltage of audio frequency applied to the pipe 10 by the oscillator 13 (see FIGURE 1) will give rise to an average signal which is represented by the flat part of the curve in FIGURE 5B.

Referring now to FIGURE 5A, a buried coated pipe is shown at 10 which has two holidays or flaws in the coating at 40 and 41, one of which (40) is located beneath a pavement 42. There exists a field around each of the holidays 40 and 41 which is more intense than the field surrounding the pipe generally. The fields surrounding the holidays 40 and 41 are indicated by concentric circles in FIGURE 5A. If both capacitor members, e.g., plates 31a and 31b (see FIGURE 2) are remote from a holiday, they will be at the same potential and only a minimum or average signal will be heard, which is indicated by the flat part of the curve in FIGURE 5B. As one of the capacitor members approaches the position shown at $y$ in FIGURE 5A directly overlying the holiday 41 (or 40), the potential difference between the capacitor members will increase, hence the signal level will increase to a peak as shown at 43 in FIGURE 5B. As this capacitor member passes beyond dead center position directly overlying the holiday 41 and the two capacitor members reach positions which are equidistant from the holiday, as shown at $x^1$ and $y^1$, then the potential difference will drop to zero and a null point 44 will appear in the graph of the signal level. A second peak 45 will occur when the other capacitor member is centered over the holiday. The null point 44 corresponds most nearly to the location of the holiday.

I have found that, by this means, very small flaws in buried pipe can be located. Even flaws such as that shown at 40 which are beneath a pavement can be located with ease and precision. As stated, in normal operation a null point (i.e., a low signal level occurring between two closely adjacent signal peaks) will indicate more exactly than the peaks the location of a flaw. If the close proximity of two or more flaws interferes with this technique, or if two or more widely spaced flaws happen to underlie the two capacitor members, the technique can be varied by having the operators proceed at a right angle to the pipeline.

In FIGURES 1 to 4 and in the description above, it has been assumed that metal plates each having a suitable capacitance are employed. I have found, however, that the human body itself provides ample capacitance. Therefore, in FIGURES 2 and 4, the capacitor plates 31a and 31b and the metallized jackets 35a and 35b may be dispensed with. In such case the wire 30 will be in electrical contact with the body of each operator. For example the capacitor plates 31a and 31b may be metal hand grips which are grasped by hand and the metallized jackets 35a and 35b may be replaced by metallized belts or girdles in electrical contact with the bodies of the operators, or by metal wrist bands. In this manner the body of each operator functions as a capacitor.

In such event (i.e., the employement of human operators as capacitors) it is preferred that shoes be worn which have good insulating soles. If electrical (i.e., conductive) contact exists between the body of the operator and the ground, then a conductivity signal will be added to the capacitance signal. As noted above the conductivity signal is distorted or fluctuates by reason of other factors such as the degree of conductivity of the underlying soil, the presence of a pavement, and the degree of electrical contact with the soil. By effectively insulating the body of the operator from the ground such disadvantages are avoided.

The alternatives of using capacitor plates and of using the bodies of operators as capacitors provides the advantage of flexibility. Thus in wet soil or under other conditions which might connect human operators electrically to the buried pipe, capacitor plates may be used which have insulating handles, but under dry conditions and on pavements the use of plates may be dispensed with.

Various types of oscillator circuit and receiver-amplifier circuit may be used. Audio frequencies are preferred but nonaudio frequencies may be used in conjunction with a suitable frequency multiplier or divider or with a signal indicator operated by a nonaudio signal.

It is preferred, however, to employ an audio oscillator having a frequency within the 750–800 c.p.s. range and a receiver-amplifier which is tuned to that frequency and is provided with a suitable filter to attenuate frequencies outside the selected range. It is also preferred to employ an oscillator circuit which is capable of a considerably greater peak power output than customarily used with Pearson type detector, e.g., about 15 watts instead of a few hundred milliwatts.

Figure 6:
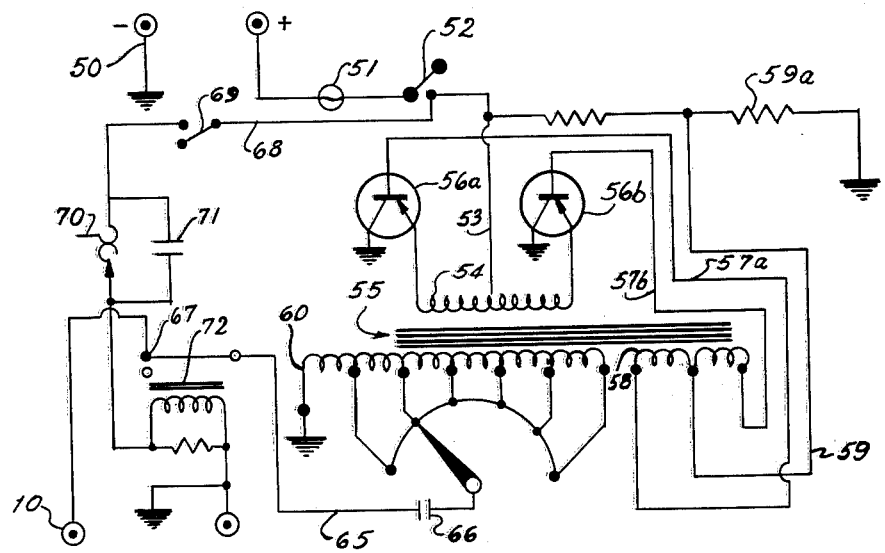
FIGURE 6 is a diagrammatic circuit drawing of the preferred audio oscillator.

A preferred oscillator circuit is shown in FIGURE 6, and a preferred receiver-amplifier circuit is shown in FIGURE 7.

Referring now to FIGURE 6 a power source is shown at 50 which may be, for example, a 12-volt storage battery such as an automobile storage battery. The positive terminal of the power source is connected through a fuse 51 and a toggle switch 52 to the center tap of the primary winding 54 of a transformer 55. The ends of the winding 54 are connected to type 2N256 CBS transistors which are shown at 56a and 56b and which are also connected by leads 57a and 57b, respectively, to the ends of a secondary winding 58 whose center tap is grounded through a lead 59 and a resistor 59a. The winding 58 provides the necessary feedback to cause the system to oscillate at the desired frequency, e.g., 750 c.p.s. The secondary winding 60 of the transformer 55 is tapped at several points to deliver desired peak voltages, for example, five, ten, twenty-five, fifty, seventy-five and one hundred volts. The selected tap is connected by a lead 65 through a capacitor 66 and a normally closed relay operated switch 67 to the pipe which is shown at 10. There is also incorporated in the circuit an interrupter as follows: A lead 68 having a switch 69 is connected through a flasher 70 and condenser 71 to a relay 72 thence to ground. When the relay 72 is energized it opens the switch 67 and therefore interrupts the audio signal applied to the pipe 10. This interruption occurs cyclicly at a suitable frequency, for example, 2 c.p.s. Its effect is to impose upon an otherwise steady high frequency hum a periodic interruption or beat which aids in distinguishing the intended signal from other signals and from noise.

Commenting further on the oscillator circuit, the output of the transformer winding 60 is an alternating voltage having a frequency of 750 c.p.s., and a peak voltage of about 100 volts. The secondary winding 60 is, however, tapped at 5, 10, 25, 50 and 75 volts as well as at 100 volts for the following reason: Each pipe inspected for flaws has its own electrical characteristics, which vary considerably from one pipe to the other because of the nature of the pipe, its coating and ground conditions. Thus a larger pipe and/or a better ground connection will require less voltage for suitable power input than a smaller pipe and/or a poorer ground connection. A voltage is selected to match most closely the particular local conditions and to apply suitable power to the pipe.

Referring now to FIGURE 7 a transistor switching circuit is there shown whose input (from capacitor plates such as those shown at 17a and 17b in FIGURE 1) is through a jack 80 and whose output, e.g., to earphones, is through a jack 81. Four transistor-type amplifier stages are shown at 82a, 82b, 82c and 82d, each having a filter 83a, 83b, etc., which is designed to attenuate all signals except those in the desired range, for example 750 to 800 c.p.s. The transistors employed may be of type PNP G.E. 2N508. Bias resistors are shown at 84, the values of which will be selected to give full gain up to 130° F., as by placing the receiver-amplifier in an oven and substituting values of the bias resistors until full gain is reached. The variable resistor 85 is a volume control placed in the first stage to keep the filters in subsequent stages from being overloaded with a strong signal.

It may also be desirable to interpose a matching transformer between the capacitor plates and the input of the receiver-amplifier because in a transistor amplifier the input impedance is preferably much lower than the input impedance to the grid of a vacuum tube amplifier. The capacitor plates of the present invention have high impediance. Therefore to more properly match the capacitor plates with the transistor amplifier, a transformer (not shown) may be employed whose primary (connected to the capacitor plates) has a high impedance and those secondary (connected to the amplifier) has a low impedance.

By means of capacitor members such as metal plates, metallic vests, or the bodies of human operators; by means of a suitable signal source such as the audio oscillator shown; and by means of an appropriate receiver-amplifier such as that shown and a set of earphones, it is possible to survey buried pipe quickly and accurately for the existence and location of flaws. Once the pipe has been located lateral drift can be avoided by noting diminution of the average signal level. As the operator or operators proceed along the ground overlying a pipe, sharp signal peaks will be discerned as holidays or flaws are approached. Each peak, or to be more exact the null point between each pair of closely adjacent peaks, corresponds to and locates a flaw. As noted, in some cases it may be difficult to discern null points, and it may be desirable for the operators to proceed transversely to the pipeline.

It will, therefore, be apparent that a novel and very useful method and apparatus have been provided for detecting flaws in buried pipe and the like. It will also be apparent that the apparatus can be used in connection with other remote conductors having protective or insulating coatings.

I claim:

1. Apparatus of the character described comprising a pair of metallized garments adapted to be worn by human operators, a receiver-amplifier having an input terminal connected to said garments and an output terminal and adapted to receive and amplify a signal voltage induced in said garments by an oscillating electromagnetic field such as applied to a buried pipe by an electrical oscillator, and signal receiving means connected to the output terminal of said receiver-amplifier adapted to discern the amplified signal.

2. A detector for locating flaws in the protective, nonconductive coating of a buried, hollow, highly-conductive pipeline whose conductivity remains substantially unaffected by such flaws, said detector comprising: a source of alternating inducing current connected to said pipe to cause current flow therethrough; movable, capacitive pick-up means insulated from the ground and said source, said pick-up means being selected to have a capacity with respect to the ground to be highly sensitive to the field generated by the portion of said inducing current leaking through flaws in said protective coating from said pipeline to the ground and to be relatively insensitive to the field generated by the inducing current along said pipeline; and an amplifier means connected to said capacitive pick-up means, said amplifier means being tuned to the frequency of said alternating inducing current to provide an output signal indicative of the voltage induced in said capacitive pick-up means, whereby movement of said capacitive pick-up means over and along said buried pipeline provides a readily discernable peak signal when positioned over a flaw.

3. A detector for locating flaws in the protective, nonconductive coating of a buried, hollow, highly-conductive pipeline whose conductivity remains substantially unaffected by such flaws, said detector comprising: a source of alternating inducing current connected between opposite ends of said pipe to cause current flow therethrough; capacitive pick-up means insulated from the ground and said source and movable over and along said pipeline; and an amplifier means connected to said capacitive pick-up means, said amplifier means being tuned to the frequency of said alternating inducing current to provide an output signal indicative of the voltage induced in said capacitive pick-up means, the combination of said pick-up means and said amplifier means being selected to provide a readily discernable signal when said pick-up means is over or near the field generated by the portion of said inducing current leaking through flaws in said protective coating from said pipe to the ground.

4. A detector in accordance with claim 3 in which the capacitive pick-up means includes a pair of spaced capacitive members electrically connected to one another to provide a parallel combination so that the signals induced on respective members are added when in phase and subtracted when out of phase.

5. A detector in accordance with claim 4 in which the capacitive members comprise metallized suits wearable by human operators.

6. A method of locating flaws in the protective, nonconductive coating of a buried, hollow, highly-conductive pipeline whose conductivity remains substantially unaffected by such flaws, said method comprising the steps of: applying an alternating inducing current to said highly-conductive pipeline; moving a ground insulated capacitive probe means over the ground and along said pipeline for detecting the current passing through a flaw from said pipeline to the surrounding ground, said leakage current generating a field of sufficient strength to induce a signal in said pick-up means, which is proportioned to the strength of the leakage current field; and amplifying said signal sufficiently to produce a readily discernable signal peak when said probe approaches or recedes a flaw in said protective coating.

7. A method of locating flaws in the protective, non-conductive coating of a buried, hollow, highly-conductive pipeline whose conductivity remains substantially unaffected by such flaws, said method comprising the steps of: applying an alternating inducing current to said highly-conductive pipeline which causes a leakage current to ground when the pipeline, through a flaw in said protective coating, is exposed to the ground; moving a capacitive probe means over the ground and along said pipeline for detecting the alternating field set-up by said leakage current, said alternating field inducing a signal in said probe means; and amplifying said induced signal sufficiently to produce a readily discernable signal peak when said probe approaches or recedes a flaw in said protective coating.

References Cited in the file of this patent

UNITED STATES PATENTS

| | | |
|---|---|---|
| 1,297,929 | Taylor | Mar. 18, 1919 |
| 1,745,419 | Henneberger | Feb. 4, 1930 |
| 2,731,598 | Herbert | Jan. 17, 1956 |
| 2,885,633 | Cook | May 5, 1959 |

FOREIGN PATENTS

| | | |
|---|---|---|
| 339,731 | Great Britain | Dec. 18, 1930 |